United States Patent
Balachandran et al.

(10) Patent No.: US 8,180,283 B2
(45) Date of Patent: May 15, 2012

(54) METHOD OF PROVIDING FEEDBACK TO A MEDIA SERVER IN A WIRELESS COMMUNICATION SYSTEM

(75) Inventors: Krishna Balachandran, Morganville, NJ (US); Doru Calin, Manalapan, NJ (US); Eunyoung Kim, Parlin, NJ (US); Kiran M. Rege, Marlboro, NJ (US)

(73) Assignee: Alcatel Lucent, Paris (FR)

( * ) Notice: Subject to any disclaimer, the term of this patent is extended or adjusted under 35 U.S.C. 154(b) by 1170 days.

(21) Appl. No.: 11/674,802

(22) Filed: Feb. 14, 2007

(65) Prior Publication Data

US 2008/0192710 A1 Aug. 14, 2008

(51) Int. Cl.
*H04B 7/14* (2006.01)
*H04B 1/00* (2006.01)
(52) U.S. Cl. ............................................ 455/24; 455/69
(58) Field of Classification Search .................. 370/338, 370/310; 455/24, 69
See application file for complete search history.

(56) References Cited

U.S. PATENT DOCUMENTS

| | | | | |
|---|---|---|---|---|
| 6,460,036 B1 * | 10/2002 | Herz | | 707/748 |
| 2003/0140159 A1 * | 7/2003 | Campbell et al. | | 709/231 |
| 2003/0198184 A1 | 10/2003 | Huang et al. | | 370/231 |
| 2004/0098748 A1 | 5/2004 | Bo et al. | | 725/105 |
| 2004/0240390 A1 | 12/2004 | Seckin | | 370/252 |
| 2005/0180448 A1 * | 8/2005 | Kobayashi | | 370/432 |
| 2006/0095472 A1 * | 5/2006 | Krikorian et al. | | 707/104.1 |

FOREIGN PATENT DOCUMENTS

EP 1 209 838 A1 5/2001

OTHER PUBLICATIONS

International Search Report and Written Opinion mailed Jul. 2, 2008.

* cited by examiner

*Primary Examiner* — Nick Corsaro
*Assistant Examiner* — Joel Ajayi
(74) *Attorney, Agent, or Firm* — Williams, Morgan & Amerson, P.C.

(57) ABSTRACT

The present invention provides a method involving a media server, a wireless network, and at least one media client associated with at least one air interface with the wireless network. The method includes accessing first information indicative of at least one state of the at least one media client. The first information is provided by the at least one media client. The method also includes accessing second information indicative of resources associated with the at least one air interface. The second information is provided by the wireless network. The method further includes providing at least one feedback parameter to the media server. The at least one feedback parameter is formed based on the first and second information.

19 Claims, 3 Drawing Sheets

METHOD OF PROVIDING FEEDBACK TO A MEDIA SERVER IN A WIRELESS COMMUNICATION SYSTEM

BACKGROUND OF THE INVENTION

1. Field of the Invention

This invention relates generally to communication systems, and, more particularly, to wireless communication systems.

2. Description of the Related Art

Streaming media services (e.g. music, video) over wireless communication networks have been gaining in popularity, and are likely to become commercially important to wireless service providers in the near future. A major impediment to their success is the often poor and/or unreliable audio or video quality associated with these services. Packets transmitted through the wireless communication network may be lost, delayed, or experience jitter. For example, signal strength fluctuations due to environmental changes and the need to share the wireless access medium among multiple users lead to significant fluctuations in the rate at which packets carrying a media stream are delivered to mobile units and/or the applications running on the mobile unit such as a media player. Packets may also be lost as they traverse the air interface from the media server to the client, which may cause interruptions in the media service and/or degraded quality of the media service. Conventional media sessions attempt to reduce the effects of lost packets, delayed packets, and/or jitter by buffering the received data stream.

FIG. 1 conceptually illustrates one exemplary embodiment of a conventional system 100 for streaming media over a wireless network 105. In the illustrated embodiment, the system 100 includes a media server 110 that streams media over the wireless network 105 to at least one client 115, such as a mobile unit or an application running on the mobile unit. The media server 110 includes a media encoder 120 that encodes a signal representative of the media that is being streamed to the client 115. The media encoder 120 is capable of encoding streaming media at one or more average bit rates, referred to as hereafter as encoding rates. Typically, for a given media, a higher encoding rate is associated with better media quality from the end-user's perspective. Moreover, even for a given encoding rate (which refers to the average bit-rate at the output of the encoder), the actual bit rate at the output of the encoder can vary substantially over time depending on the corresponding media content. For example, relatively high bit rates may be observed during image sequences that include substantial motion or have a high degree of detail, whereas relatively low bit rates may be observed during static images.

Plots 125(1-n) show the cumulative encoded bytes (vertical axis in arbitrary units) at the output of the media encoder 120 as a function of time (horizontal axis in arbitrary units) for different encoding rates. The encoding rate corresponds to the average slope of the corresponding plot. Plots 125(1-n) clearly point out the differences in the various encoding rates the media encoder 120 is capable of outputting. Moreover, as illustrated by plots 125(1-n), for each encoding rate, the instantaneous bit rate at the output of the media encoder 120, represented by the slope of the corresponding curve as a function of time, can be seen to vary a great deal over time. As explained earlier, if an image in a video stream includes a relatively large percentage of regions that are in motion or have a high degree of detail, then the number of bytes at the output of the media encoder 120 may increase, resulting in a high (instantaneous) bit rate. However, if the image in the video stream changes so that the percentage of regions that are in motion or have a high degree of detail decreases, then the number of bytes at the output of the media encoder 120 may decrease resulting in a low (instantaneous) bit rate. The media server 110 may therefore include a rate shaping element 130 to provide an approximately constant number of transmitted bytes per unit time to the wireless network 105, as indicated by the plot 135.

The wireless network 105 typically performs scheduling of the packets that are transmitted over the air interface to the client 115, as well as implementing adaptive modulation and coding of the packets and automatic repeat request functionality. However, as discussed above, the packets transmitted by the wireless network 105 may be lost, delayed, and/or jittery. Consequently, the number of bytes per unit time that are provided to the client 115 may vary over time, as indicated by the plot 140. In the illustrated embodiment, the client 115 includes a de-jitter buffer 145 and a pre-decoder buffer 150 to attempt to compensate for lost packets, delayed packets, and/or jittery packet arrival times. For example, packets received by the client 115 may be stored in the de-jitter buffer 145 and then pushed out of the de-jitter buffer 145 at an approximately constant number of bytes per unit time, as indicated by the plot 155. The pre-decoder buffer 150 may receive the data stream provided by the de-jitter buffer 145 and may provide the received packets to a media decoder 160 at a desired number of bytes per unit time, as indicated by the plot 165.

The media server 110 and the client 115 include built-in features that allow the client 115 to send intermittent feedback to the media server 110, as indicated by the arrow 170. The feedback 170 typically informs the media server 110 of end-to-end performance metrics such as the rate at which packets are being delivered, loss of packets, available buffer space, and the like. The end-to-end performance metrics are used in conjunction with information local to the media server 110 to control the source encoding rate and/or transmission rate. However, end-to-end performance metrics only provide information that can be deduced from the data stream received by the client 115. Furthermore, at least in part to reduce overhead that must be transmitted over limited uplink bandwidth available for streaming media sessions, the client 115 typically provides the feedback 170 on a relatively long time scale. e.g. every 3-5 seconds.

The lack of direct knowledge of network conditions and/or the effects of competing users, as well as the long time scale, limits the usefulness of the feedback 170. For example, the wireless network 105 typically implements scheduling and rate adaptation techniques based on fast channel quality feedback over the wireless link in order to exploit multi-user diversity resulting from fast variations (e.g., on the scale of milliseconds) in channel quality. These techniques result in significant variability in the rate achieved across the wireless link for a given media session, and the feedback 170 is not provided to the media server 110 often enough to help it effectively respond to rapid variations in the supported transmission rate. As a result, the conventional media server 110 cannot deliver the best possible media quality in the presence of rapid variations in the transmission rate over the air interface. Furthermore, the feedback 170 does not include information that provides direct knowledge of network conditions and users competing for the shared bandwidth, which precludes the possibility of the media server 110 employing more sophisticated methods to predict buffer overflows and underflows, which can help the server 110 take proactive actions to avoid these events.

Since the media server 1 10 can only shape transmission rates based upon the relatively slow end-to-end feedback 170, the resources that are available for streaming media over the wireless network 105 may not be used in an optimal or efficient manner. For example, the media server 110 typically selects a transmission rate based on the feedback 170. The selected transmission rate may reflect the effects of averaging conditions in the wireless network 105 over a relatively long period of time. However, the actual transmission rates that are supported by the wireless network 105 at any given moment may vary widely from this average rate, resulting in an inefficient use of the resources. If the average values are used to select a high media source encoding rate that is not sustainable during the time period that packets are transmitted at this rate, packet losses may occur, resulting in unacceptable media quality; also, downlink resource availability for other users or sessions may be undesirably reduced. On the other hand, selecting lower source rates may underutilize the available resources during periods when the wireless network could support higher transmission rates. Under-utilization of the available resources may mean delivering the media at less than the best possible quality level under prevailing conditions.

SUMMARY OF THE INVENTION

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the present invention, a method is provided involving a media server, a wireless network, and at least one media client associated with at least one air interface with the wireless network. The method includes accessing first information indicative of at least one state of the at least one media client. The first information is provided by the at least one media client. The method also includes accessing second information indicative of resources associated with the at least one air interface. The second information is provided by the wireless network. The method further includes providing at least one feedback parameter to the media server. The at least one feedback parameter is formed based on the first and second information.

In another embodiment of the present invention, a method is provided involving a media server, a wireless network, and at least one media client associated with at least one air interface with the wireless network. The method includes receiving at least one feedback parameter at the media server. The at least one feedback parameter is formed based on first information indicative of at least one state of the at least one media client and second information indicative of resources associated with the at least one air interface. The first information is provided by the at least one media client and the second information is provided by the wireless network. The method also includes providing at least one packet at a rate determined based on the at least one feedback parameter.

BRIEF DESCRIPTION OF THE DRAWINGS

The invention may be understood by reference to the following description taken in conjunction with the accompanying drawings, in which like reference numerals identify like elements, and in which.

Figure 1:
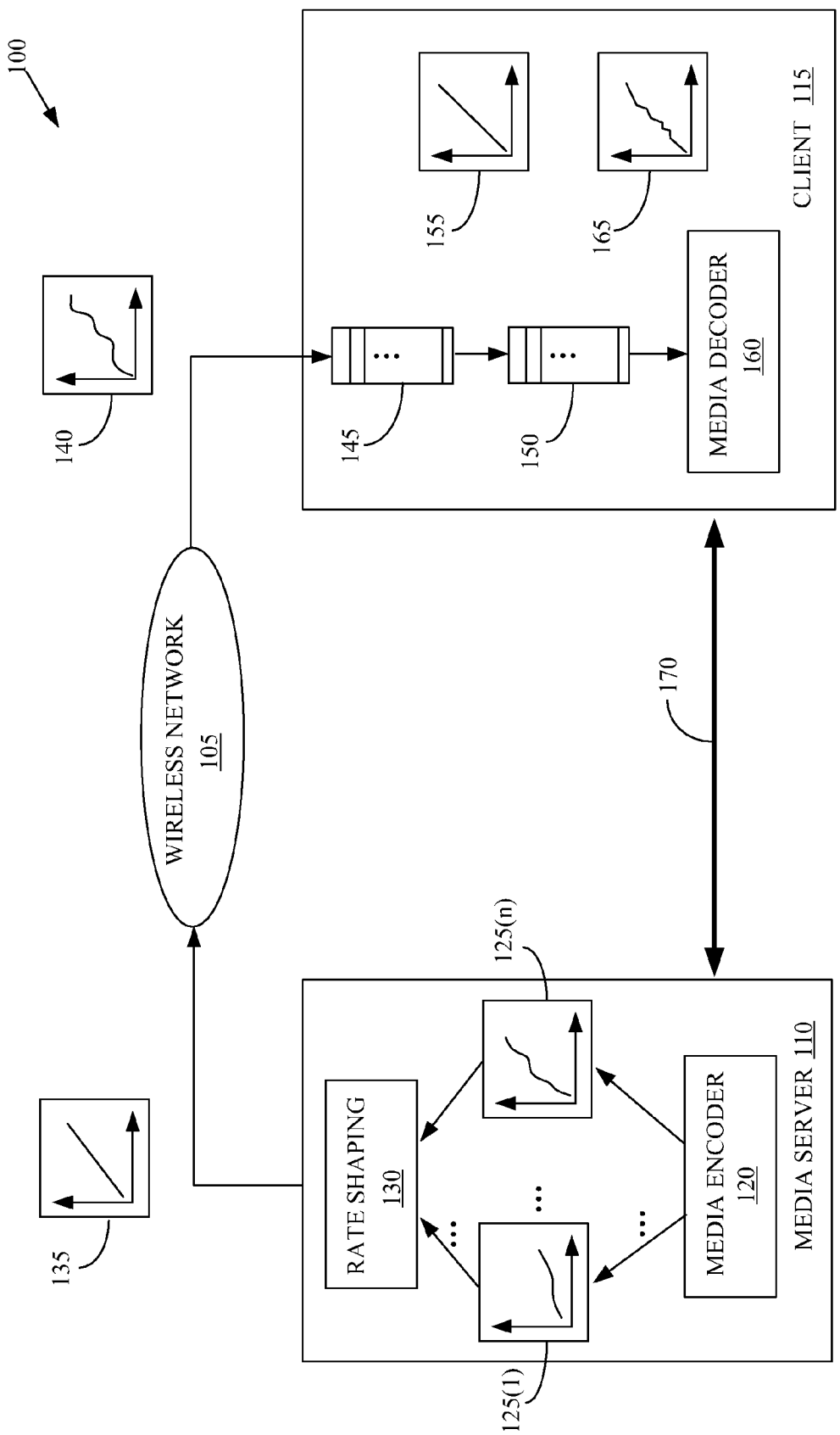
FIG. 1 conceptually illustrates one exemplary embodiment of a conventional system for streaming media over a wireless network.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Figure 2:
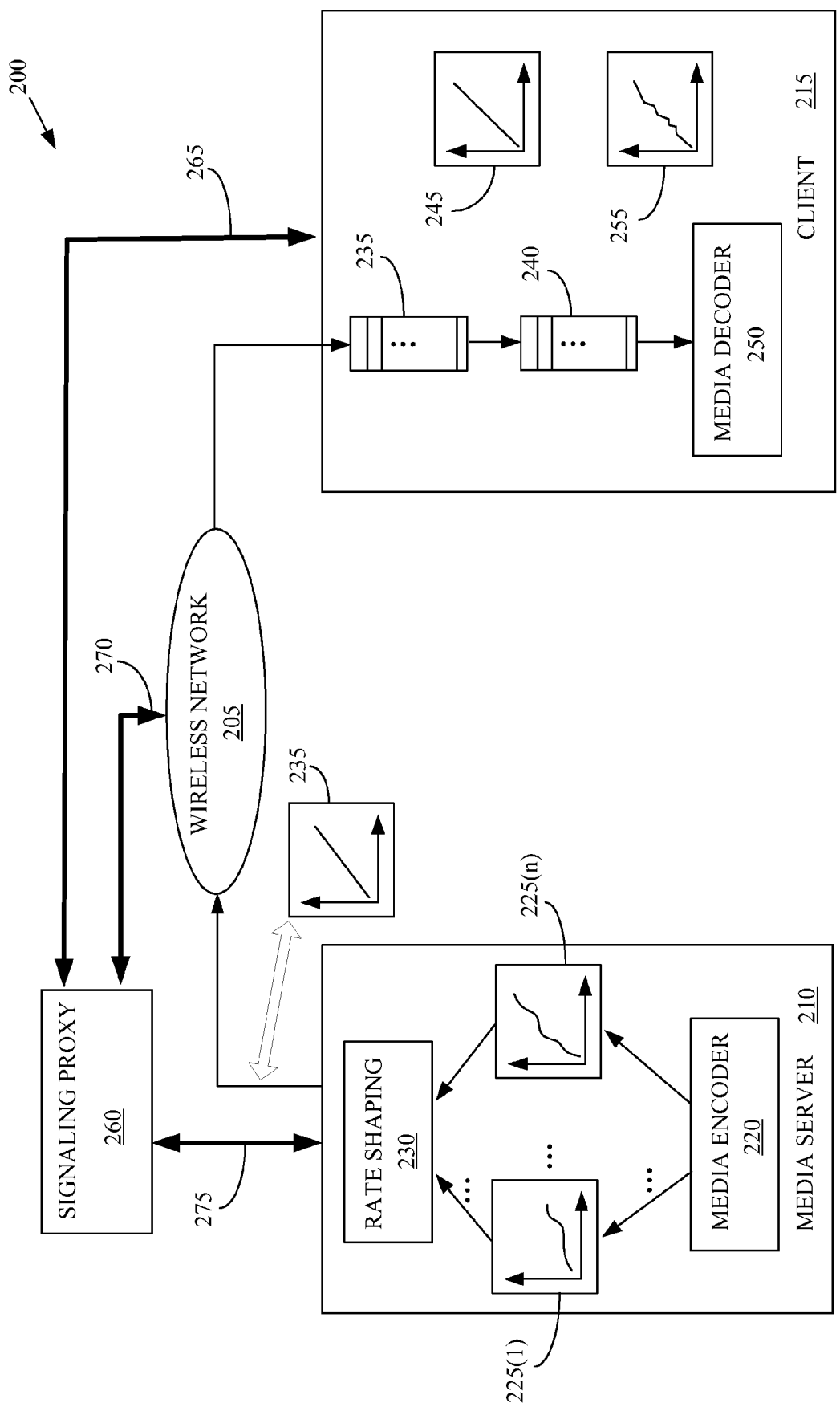
FIG. 2 conceptually illustrates a first exemplary embodiment of a system for streaming media over a wireless network, in accordance with the present invention.

FIG. 2 conceptually illustrates a first exemplary embodiment of a system 200 for streaming media over a wireless network 205. In the illustrated embodiment, the system 200 includes a media server 210 that streams media over the wireless network 205 to at least one client 215, such as a mobile unit or an application running on the mobile unit. The wireless network 205, the media server 210, and the client 215 may operate according to the Universal Mobile Telecommunication System (UMTS) standards and/or protocols. For example, in streaming media sessions, the Real-time Transport Protocol (RTP) may be used to carry the media content and the associated Real Time Control Protocol (RTCP) may be used to carry the associated control packets. A third protocol, the Real Time Streaming Protocol (RTSP), may be used for the transmission of messages for session setup (including capability exchange), teardown, and some user actions (e.g. pause, fast-forward, etc.). Details regarding RTP/RTCP and RTSP can be found in the Internet Engineering Task Force Requests for Comments (IETF RFCs) 1889 and 2326, respectively. However, persons of ordinary skill in the art having benefit of the present disclosure should appreciate that the first exemplary embodiment is intended to be illustrative and that the present invention is not limited to these standards and/or protocols.

The media server 210 includes a media encoder 220 that encodes a signal representative of the media that is being streamed to the client 215. The media encoder 220 is capable of delivering the media at one or more encoding rates. Also, as described earlier, for each encoding rate, the actual instantaneous bit rate at the output of the media encoder 220 varies with time depending on the media content. The encoded data streams include information that may be used to represent audio, video, a combination thereof, or any other desirable media. In an alternative embodiment, the media server 210 does not include the media encoder 220. Instead, the media encoder 220 is a separate device that encodes the media at possibly different (encoding) rates. The media server 210 stores the encoded media output produced by the media encoder 220 in different files and streams the media to client devices during corresponding media sessions by reading from the stored encoded media files.

Plots 225(1-n) show cumulative encoded bytes (vertical axis in arbitrary units) at the output of the media encoder 220 as a function of time (horizontal axis in arbitrary units) for different encoding rates. As shown in plots 225(1-n), in each plot, the actual (instantaneous) bit rate, which corresponds to the slope of the corresponding plot, varies over time. For example, if an image in the corresponding video stream includes a relatively large percentage of regions that are in motion or have a high degree of detail, then the instantaneous bit rate at the output of the media encoder 220 may be high. However, if the image in the video stream changes so that the percentage of regions that are in motion or have a high degree of detail decreases, then the instantaneous bit rate at the output of the media encoder 220 may be low. The media server 210 may therefore include a rate shaping element 230 to provide an approximately steady output stream to the wireless network 205, as indicated by the plot 235. The target transmission rate used by the rate shaping element 230 may be selected based upon feedback from the wireless network 205 and/or the client 215, as will be discussed in detail below.

In the first exemplary embodiment, the client 215 includes a de-jitter buffer 235 and a pre-decoder buffer 240 to attempt to compensate for lost packets, delayed packets, and/or jittery packet arrival times. For example, packets received by the client 215 may be stored in the de-jitter buffer 235 and then pushed out of the de-jitter buffer 240 at an approximately constant number of bytes per unit time, as indicated by the plot 245. The pre-decoder buffer 240 may receive the data stream provided by the de-jitter buffer 235 and may provide the received packets to a media decoder 250 at a desired number of bytes per unit time, as indicated by the plot 255. However, persons of ordinary skill in the art having benefit of the present disclosure should appreciate that a first exemplary embodiment of the client is intended to be illustrative and alternative embodiments of the client 215 may not include exactly the same number and/or structure of buffers 235, 240.

The wireless communication system 200 includes a signaling proxy 260. In one embodiment, the signaling proxy 260 may be attached to a wireless access network entity in the wireless network 205, such as a Gateway GPRS Support Node (GGSN) specified in the 3GPP Universal Mobile Telecommunications System (UMTS) standard and/or a Packet Data Serving Node (PDSN) specified in the 3GPP2 cdma2000 standard. However, in other embodiments of the invention it is possible to attach the signaling proxy to other access network entities such as a Serving GPRS Support Node (SGSN), a Radio Network Controller (RNC), or, in the case of an access network comprising base-station routers that are characterized by a flat architecture (e.g. multiple functionalities handled by RNC, SGSN and GGSN collapsed into only one entity, the base-station router), to the base-stations themselves. The signaling proxy 260 may be implemented in software, firmware, hardware, or any combination thereof.

The signaling proxy 260 receives feedback 265 from the client 215. In one embodiment, the feedback 265 from the client 215 is indicative of the current session state of the client 215. For example, the signaling proxy 260 may intervene in the flow of RTCP and RTSP messages. During session setup and teardown as well as during the lifetime of a session, control messages (e.g., RTCP and RTSP messages associated with the media session) generated by the client 215, which would normally go directly to the media server 210 are, instead, provided to the signaling proxy 260. These messages may help the signaling proxy 260 keep track of user actions as well as the state of the client 215 (e.g. buffer contents, expected time for overflow/underflow, etc.). In one embodiment, the RTP packets carrying the media content may flow directly from the media server 210 to the client 215.

The signaling proxy 260 also receives feedback 270 from the wireless network 205. In one embodiment, the feedback 270 from the wireless network 205 is indicative of resources associated with an air interface between the wireless network 205 and the client 215. For example, the signaling proxy 260 may receive fast feedback 270 in the form of RAN-Proxy Control Packets from the sending Radio Link Control Protocol handler, which may be implemented without loss of generality at the Radio Network Controller. In the case of a wireless access network with base-station routers, the signaling proxy 260 may be attached to these routers and the information concerning buffer levels, available bandwidth, number of competing users, etc. will be locally available. The feedback 270 apprises the signaling proxy 260 of the detailed system information and system view available from entities in the wireless network 205, such as buffer levels at the RNC, the number of users sharing the downlink bandwidth with the media session, the bandwidth available to each user and the like.

In various alternative embodiments, the feedback 265, 270 may either be provided periodically and/or may be triggered by certain events. For example, the wireless network 205 may provide feedback 270 in response to detecting changes in link quality metrics such as a signal to interference plus noise ratio dropping below a certain threshold or rising above a certain threshold. For another example, the wireless network 205 may provide feedback 270 in response to detecting an increase or a decrease in buffer levels.

The signaling proxy 260 uses the feedback 265, 270 to form control information that may be provided to the media server 210, as indicated by the arrow 275. In one embodiment, the signaling proxy 260 uses the information in the feedback 265, 270 respectively from the client 215 and from the sending Radio Link Control Protocol entity or entities in the wireless network 205 to generate a set of feedback parameters that are signaled back to the media server 215. In one embodiment, the feedback parameters are included in Proxy-Server Control Packets that can be carried using the existing protocols (e.g. RTCP) with suitable extensions to minimize changes to existing media servers and supporting infrastructures. The feedback parameters may enhance the media server 210's knowledge of conditions at the clients 215 and over the wireless network 205. In one embodiment, the control packets transmitted by the signaling proxy 260 appear just like those generated by the client 215 except that they now contain one or more additional parameters, such as the maximum rate (for the corresponding media session) that can be currently sustained in the wireless network 205, the amount of data belonging to the client 215 that is buffered at the RNC, the number of RTP packets belonging to the client 215 that were delivered to the client 215 over the previous feedback interval, and the like. The rest of the contents of the Proxy-Server Control Packets may be preserved to correspond to existing state of the art set-ups, which are based either on the RTP-RTCP protocol or on proprietary protocols.

In the illustrated embodiment, the signaling proxy 260 may be coupled to the wireless network 205 and/or the media server 210 by wired connections. The bandwidth constraints between the signaling proxy 260 and the media server 210 are much weaker (relative to the client-server channel) when the signaling proxy 260 is hosted on the high bandwidth, wired side of the network 205. Consequently, the signaling proxy 260 can send its control (feedback) packets to the media server 210 at significantly higher rates than would be possible if the client 215 and the media server 210 directly exchanged control packets over the air interface. This is a distinct advantage over the state-of-the art and may have a direct and positive impact on the quality of media connections as explained below.

In one embodiment, in the downlink direction, control information, such as the RTCP and RTSP messages, transmitted by the media server 210 may be passed on to the signaling proxy 260, which may then forward it to the client device 215, with appropriate changes if needed. This arrangement helps the signaling proxy 260 determine the session parameters negotiated between the client 215 and the server 210 and to be aware of what the expected service characteristics are from each of their viewpoints.

The capability of obtaining feedback information directly from the media client combined with the comprehensive current knowledge of airlink conditions and offered load from the RNC, puts the proxy 260 in a unique position to intelligently influence the user-perceived quality of end-to-end media transfers. Indeed, by using the information received from the client 215, as well as that received from the wireless network 205, the signaling proxy 260 is in the right position to help the media server 210 make accurate predictions about the likelihood of buffer overflows and underflows if the media server 210 were to transmit the stream at different rates.

Figure 3:
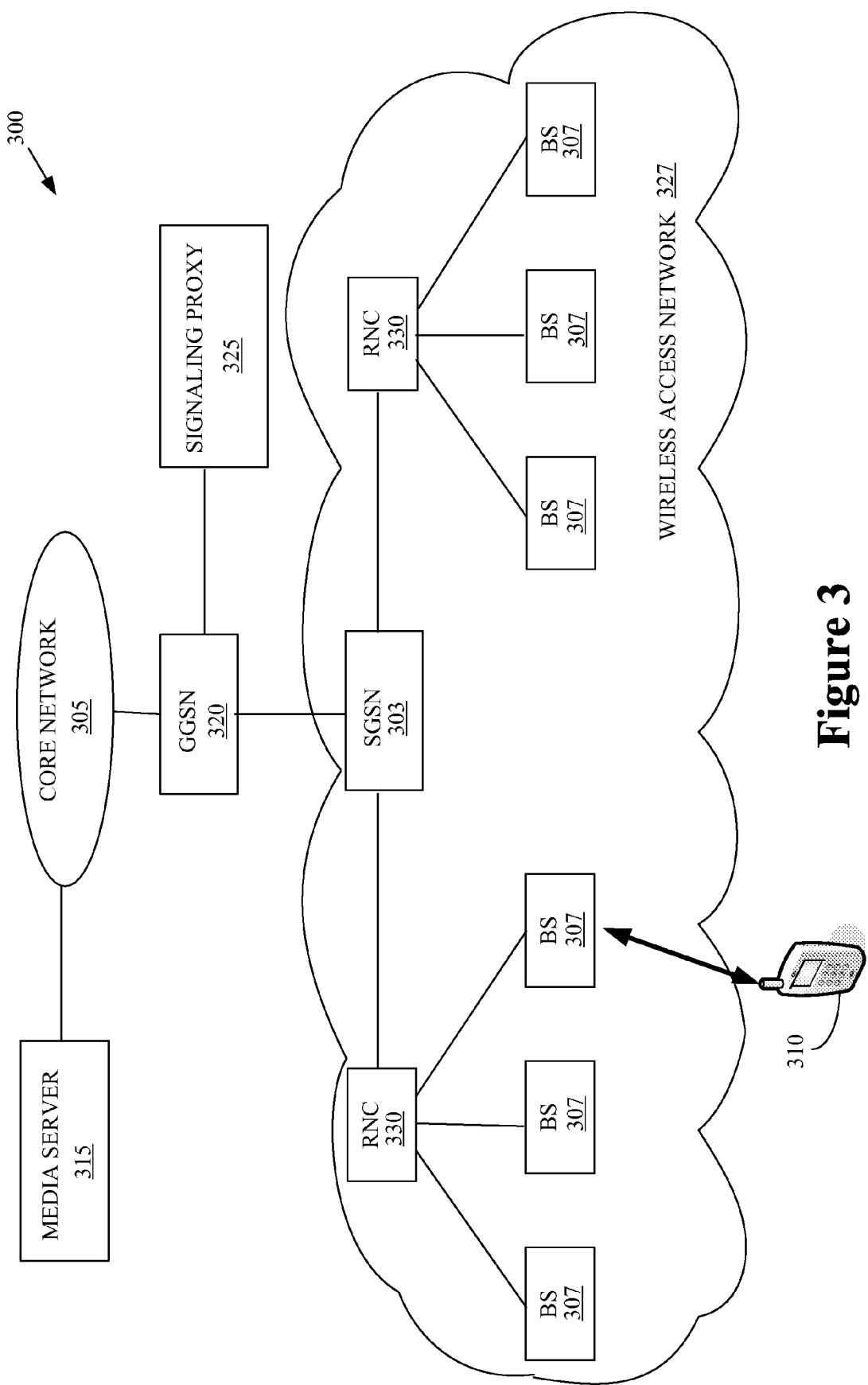
FIG. 3 conceptually illustrates a second exemplary embodiment of a system for streaming media over a wireless network, in accordance with the present invention.

FIG. 3 conceptually illustrates a second exemplary embodiment of a system 300 for streaming media over a wireless network. In the illustrated embodiment, consistent with the preceding description, the entire network between the media server 315 and the media client 310 will be referred to as the wireless network. The network segment lying between the media server 315 and the network element GGSN 320 will be referred to as core network 305 and the network segment beginning with the GGSN 320 and ending at the media client 310 will be referred to as the wireless access network 327. In the illustrated embodiment, the wireless access network 327 including one or more base stations 307 is based on the Universal Mobile Telecommunications System (UMTS) (3GPP) standard. However, the techniques described herein may also be applied to any other wireless networking technology and standards, e.g., cdma2000 High Rate Packet Data (HRPD) or IEEE 802.16e/WiMAX. In the case of cdma2000 HRPD, for instance, system 300 would appear identical to that in FIG. 3, except that the node pair, Serving GPRS Support Node (SGSN) 303 and the Gateway GPRS Support Node (GGSN) 320, are replaced by a single entity known as the Packet Data Serving Node (PDSN). Furthermore, although a hierarchical architecture is illustrated, the techniques described herein may also be applied to flat-Internet Protocol (flat-IP) based architectures where Layer 3 routing (i.e., IP) and control functions relating to the wireless access network are performed by the base station.

In the illustrated embodiment, a mobile client 310 initiates a streaming video session with a media server 315 over the wireless network 300. For example, the client 310 may request a streaming video session by sending an RTSP message to the server 315. As this message reaches the GGSN 320, it forwards it to a signaling proxy 325 instead of the server 315. The proxy 325 inspects this message, and realizing that it could be the beginning of a new streaming video session, makes an entry into its local cache. It then forwards the message to the server 315. The server 315 responds to the message and the subsequent RTSP messages exchanged by the client 310 and the server 315 to carry out "capability exchange" are also routed via the signaling proxy 325. This enables the proxy 325 to discover the relevant session parameters (e.g. bandwidth, buffer size, etc.) agreed upon by the client 310 and the server 315. If the capability exchange includes the rate or time interval at which the client 310 is to send its receiver report to the server 315, the proxy 325 modifies this parameter as it forwards the corresponding message to the server 315 so that the server 315 is prepared to receive feedback at the appropriate time interval or rate as determined by the proxy. In addition to regular reporting intervals, note that under certain conditions (e.g. changes in sustainable rate or buffer status at the RNC), the proxy 325 may also choose to autonomously send feedback reports to the server 315. The modification enables the proxy 325 to send reports to the server 315 at a much higher rate (consistent with the abundant bandwidth available between the proxy 325 and the server 315) while allowing the client 310 to send its reports (which are intercepted by the proxy 325) at a lower rate.

After the capability exchange with the server 315, the client 310 initiates the establishment of a Packet Data Protocol (PDP) context and a Radio Access Bearer (RAB) to carry the streaming video session with the desired Quality of Service over the downlink. When the RAB and the corresponding Radio Bearer (RB) have been set up, a radio network controller (RNC) 330 informs the signaling proxy 325 about the event. If the proxy 325 already has an entry in its cache for a corresponding streaming video session, it responds with a positive indication, instructing the RNC 330 to send periodic feedback (to the proxy 325) about the session's sustainable rate, buffer occupancy and the like. At a minimum, this feedback should include the sustainable rate (i.e. the maximum transmission rate at which the session can stream under the current conditions) for the session; the other parameters are optional.

From this point on, the RNC 330 begins to periodically report to the signaling proxy 325 the streaming session's sustainable rate (and, possibly, the amount of data stored in the buffer assigned for that session by the RNC 330 and/or other relevant parameters). When the server 315 starts streaming, RTP packets carrying the audio/video payload associated with the streaming session begin to flow from the server to the client 310 via the GGSN 320. In one embodiment, these packets are not routed via the signaling proxy 325. The client 310 buffers up these packets for an amount of time known in the literature as "pre-roll," and then starts decoding and playing them out. When this process begins at the client 310, the client 310 starts sending receiver reports to the server 315, informing the server 315 about one or more parameters such as the amount of data received, the amount of data lost, identifier of the packet/frame to be played out next, and so on. In one embodiment, these reports may be sent rather infrequently, at intervals of a few seconds, such as once every 3-5 seconds.

The receiver reports transmitted by the client 310 may be carried in RTCP packets. The GGSN 320 forwards all RTCP packets received in the upstream direction to the signaling proxy 325. When the proxy 325 receives the first such packet for a given session (for which it has made an entry in its local cache), it may append to the packet additional information such as the sustainable rate and, possibly, other feedback parameters for the session that it has received from the RNC 330, and forwards the packet toward the server 315. From this point on, the proxy 325 sends an RTCP feedback report to the server 315 at regular intervals. Recall that this interval is typically much shorter (e.g. in order of hundreds of milliseconds to allow both enough averaging and fast feedback— around 100 ms) than the interval at which the client 310 sends its RTCP reports. If the proxy 325 has received a client report (forwarded to it by the GGSN 320) since its last transmission of an RTCP report to the server 310, the proxy 325 may include the data reported by the client 310 as well as the feedback provided by the RNC 330 in its next RTCP report to the server. Otherwise, the client 310 includes only the RNC feedback data in its report to the server 315.

When the server 315 receives an RTCP report from the proxy 325, the server 315 sets its transmission (streaming) rate equal to the sustainable rate indicated in the report. Typically, the server 315 maintains an estimate of the client's buffer level, and, based on this estimate, makes decisions to increase the encoding rate, decrease the encoding rate or stay at the same encoding rate. That is, the server 315 decides whether a higher video encoding rate, a lower video encoding rate or the same video encoding rate should be used for subsequent frames. If the proxy report includes the amount of data currently buffered at the RNC 330, the server 325 can use this information to refine its estimate of the content level in its client buffer model. These refined estimates help the server 325 make timely (encoding) rate change decisions, avoiding potential re-buffering events while maintaining a high video quality at the client receiver. Note that using the additional information in the reports to refine the content level of the client buffer model does not alter the essence of the logic used in making (encoding) rate-change decisions.

The server 315 may also send periodic server reports to the client 310, e.g., in RTCP packets. When these packets reach the GGSN 320, they, too, are forwarded to the signaling proxy 325. The proxy 325 records relevant information in these packets before forwarding them to the client 310. If the rate at which these reports are sent by the server 325 is higher than the rate at which the client 310 expects to receive them, the proxy 325 may drop some of these reports to ensure that the client 310 receives them at a rate consistent with what it expects. In this case, the proxy may have to modify the contents of the server reports it forwards to the client 310 in order to report server statistics at a rate which is consistent with the expectations of the client 310. This flow of control packets may continue until the client 310 and/or the server 315 begins the teardown phase with the appropriate RTSP message. When the teardown phase ends, the proxy 325 instructs the RNC 330 to stop sending periodic feedback for the corresponding session. The RNC 330 complies with the instruction, and, ultimately, the corresponding PDP context, RAB and radio bearer are torn down.

Embodiments of the techniques described herein may provide a number of advantages over conventional practice. For example, in existing video service setups, the video server estimates the sustainable rate using the data provided by the client. This estimation, being indirect, often contains significant errors or may simply be obsolete, especially in dynamic operating conditions such as those typical of wireless networks. On the other hand, the sustainable rate determined by the signaling proxy may be more accurate at least in part because it is based on direct measurements. Improving the accuracy of the sustainable rate estimation allows the server to transmit data optimally, reducing the likelihood of packet losses in the access network or of underutilizing available resources.

Furthermore, in existing set-ups, because of the limited uplink bandwidth available on the wireless access network, the frequency at which the client sends feedback to video server is rather low. For instance, in RTP/RTCP-based video streaming sessions, it is typical for the client to send a (feedback) report to the server once every 5 seconds or so. Since there are no such bandwidth limitations between the proxy and the video server, the proxy can send control packets carrying the currently sustainable rate (and, possibly, other useful bits of information) much more frequently, e.g., once every 100 ms or so. This will help the server to modulate the transmit rate optimally, thus fully utilizing the network resources without running the risk of losing packets. The clients can generate their reports at rates consistent with the capability of the wireless access medium. The proxy will use these reports to update its knowledge of the client state. The reports generated by proxy (at much shorter intervals) and sent to the server will include information derived from the client reports as well as the proxy's estimate of the currently sustainable rate. Such an arrangement may insure that the client operation is unaffected by the presence of the signaling proxy, so no implementation changes are required on the media client.

Another advantage is that the techniques described herein may allow media servers to use estimated sustainable rates that are determined and conveyed to the server by the signaling proxy. In existing set-ups, the media server uses the information received from client reports to obtain an estimate of the currently sustainable rate. (E.g., via the TCP Friendly Rate Computation algorithm specified in IETF RFC 3448.) Thus, media streaming servers can simply use the periodically-received sustainable rate feedback from the proxy in place of the streaming rate values that are computed by the streaming server in accordance with the existing state-of-the-art. The rest of the server functions, in particular the logic for switching to different encoding rates, may remain unchanged. The only capability required at the media server is to be able to operate at a streaming or transmission rate based on sustainable rate prediction provided by the proxy. It is expected that this capability will not have any major implication on the server implementation. The existing mechanisms for client feedback (e.g. RTCP receiver reports) can be augmented with simple extensions to carry the sustainable rate feedback and other relevant parameters (if they are to be reported) from the proxy.

Yet another advantage of the techniques described herein is that they enable differential treatment to different sessions (streaming as well as other types) based on such parameters as level of congestion and relative priorities, and allow the applications to adapt to the prevailing conditions in a flexible and graceful manner. For instance, if the downlink is congested, the signaling proxy can lower the reported sustainable rate for low priority applications, thus forcing the corresponding servers to stream at low rates.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the invention. Accordingly, the protection sought herein is as set forth in the claims below.

What is claimed is:

1. A method, comprising:
   accessing, at a signaling proxy, first information indicative of at least one state of at least one media client, wherein the first information is received by the signaling proxy from said at least one media client at a first rate;
   accessing, at the signaling proxy, second information indicative of resources associated with at least one air interface, wherein the second information is received by the signaling proxy from a wireless network at a second rate that is at least an order of magnitude higher than the first rate;
   providing at least one feedback parameter from the signaling proxy to a media server at a third rate that is higher than the first rate, wherein said at least one feedback parameter is formed based on the first and second information.

2. The method of claim 1, wherein accessing the first information comprises accessing first information indicative of at least one of a packet delivery rate to said at least one media client, a packet loss rate associated with said at least one media client, available buffer space in said at least one media client, and an expected time for buffer overflow or underflow in said at least one media client.

3. The method of claim 1, wherein accessing the first information comprises accessing first information included in at least one of a plurality of control packets provided by said at least one media client at the first rate.

4. The method of claim 1, wherein accessing the second information comprises accessing second information indicative of at least one of a number of users sharing the downlink bandwidth of said at least one air interface associated with said at least one media client and a fraction of bandwidth of said at least one air interface available to each of said at least one media client.

5. The method of claim 1, wherein accessing the second information comprises accessing the second information provided periodically or in response to a trigger.

6. The method of claim 5, wherein accessing the second information in response to the trigger comprises accessing the second information provided in response to at least one of a change in a quality metric associated with said at least one air interface, a signal to interference plus noise ratio falling or rising relative to a threshold, a packet error rate falling or rising relative to a second threshold, or a change in a buffer level.

7. The method of claim 1, comprising forming, at the signaling proxy, said at least one feedback parameter based on the first and second information.

8. The method of claim 7, wherein forming said at least one feedback parameter comprises forming information indicative of at least one of a maximum rate available to said at least one media client, an amount of data belonging to said at least one media client that is buffered in at least one entity in the wireless network, a number of packets associated with each of said at least one media client that were delivered over at least one previous feedback interval, and contents of at least one control packet provided by said at least one media client.

9. The method of claim 1, wherein providing said at least one feedback parameter comprises providing a plurality of control packets to the media server at the third rate, the third rate being comparable to the second rate.

10. The method of claim 1, wherein the second information is received by the signaling proxy from a wireless network at a second rate that is determined based upon a rate of fluctuations in channel quality associated with the air interface.

11. The method of claim 1, wherein the first rate is approximately one every 3-5 seconds and wherein the second rate is approximately 1 per hundred milliseconds.

12. A method, comprising:
    receiving feedback parameters from a signaling proxy at a media server at a first rate, wherein said at least one feedback parameter is formed by the signaling proxy based on first information indicative of at least one state of at least one media client, wherein the first information is received by the signaling proxy from said at least one media client at a second rate, and second information indicative of resources associated with said at least one air interface, wherein the second information is received by the signaling proxy from the wireless network at a third-rate that is at least an order of magnitude higher than the second rate; and providing, from the media server, at least one packet at a transmission rate determined based on said at least one feedback parameter received from the signaling proxy.

13. The method of claim 12, wherein receiving the feedback parameters formed based on the first information comprises receiving the feedback parameters formed based on first information indicative of at least one of a packet delivery rate to said at least one media client, a packet loss rate associated with said at least one media client, available buffer space in said at least one media client, and an expected time for buffer overflow or underflow in said at least one media client.

14. The method of claim 12, wherein receiving the feedback parameters formed based on the second information comprises receiving the feedback parameters formed based on second information indicative of at least one of a number of users sharing the downlink bandwidth of said at least one air interface associated with said at least one media client and a fraction of bandwidth of said at least one air interface available to each of said at least one media client.

15. The method of claim 12, wherein receiving the feedback parameters comprises receiving information indicative of at least one of a maximum rate associated with the wireless network, an amount of data belonging to said at least one media client that is buffered in at least one entity in the wireless network, a number of packets associated with each of said at least one media client that were delivered over at least one previous feedback interval, a time-stamp or sequence number associated with the last packet delivered to said at least one media client, and contents of at least one control packet provided by said at least one media client.

16. The method of claim 12, wherein receiving the feedback parameters comprises receiving control packets at the media server at the first rate.

17. The method of claim 12, wherein providing said at least one packet comprises applying rate shaping to at least one variable bit rate data stream in accordance with the determined transmission rate.

18. The method of claim 12, wherein the second information is received by the signaling proxy from a wireless network at a second rate that is determined based upon a rate of fluctuations in channel quality associated with the air interface.

19. The method of claim 12, wherein the second rate is approximately one every 3-5 seconds and wherein the third rate is approximately 1 per hundred milliseconds.

* * * * *